Aug. 14, 1962  O. R. POTTER ET AL  3,049,083
CONVEYOR TROLLEY
Filed July 3, 1961  3 Sheets-Sheet 2
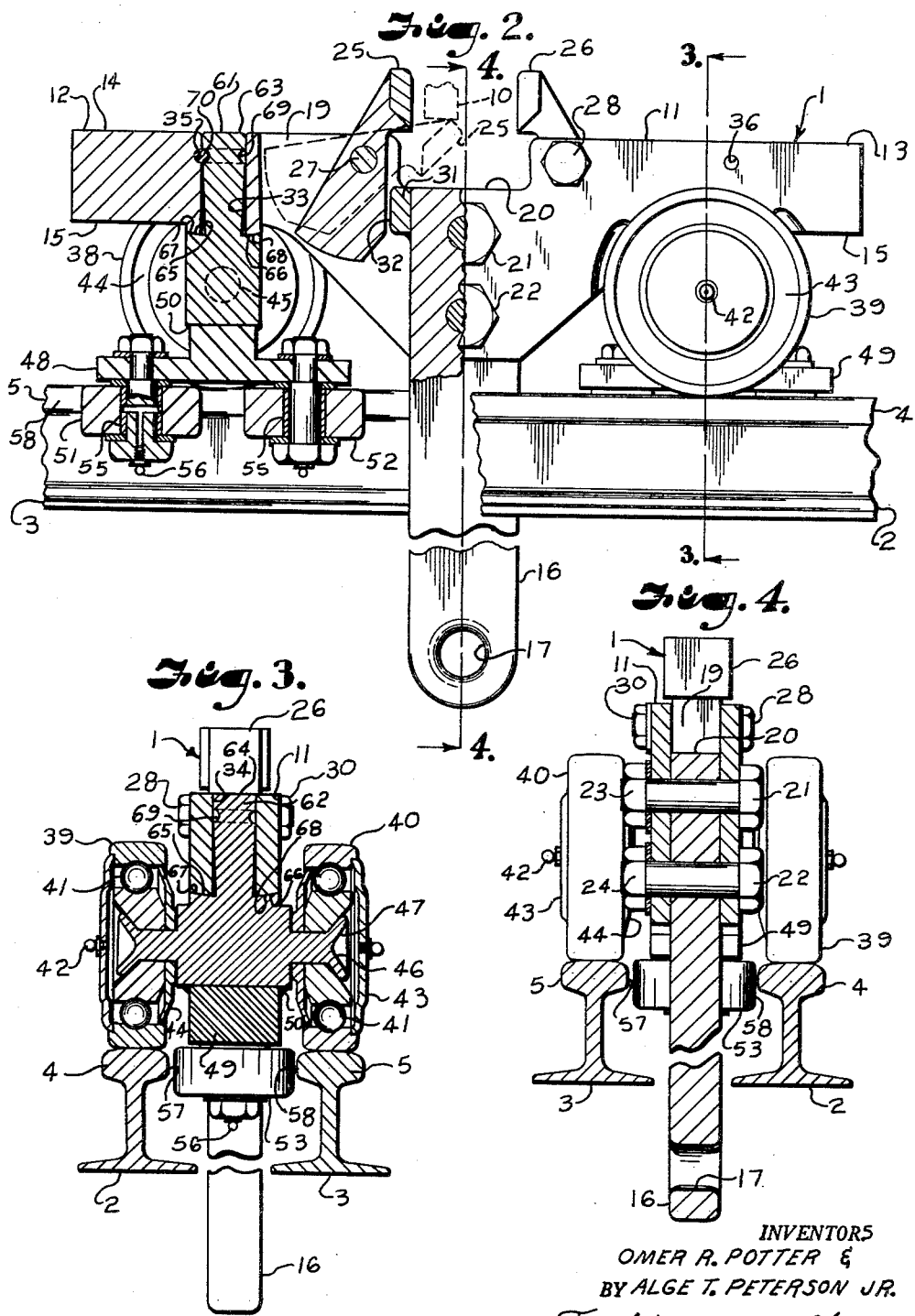
INVENTORS
OMER R. POTTER &
BY ALGE T. PETERSON JR.
Fishburn and Gold
ATTORNEYS Aug. 14, 1962

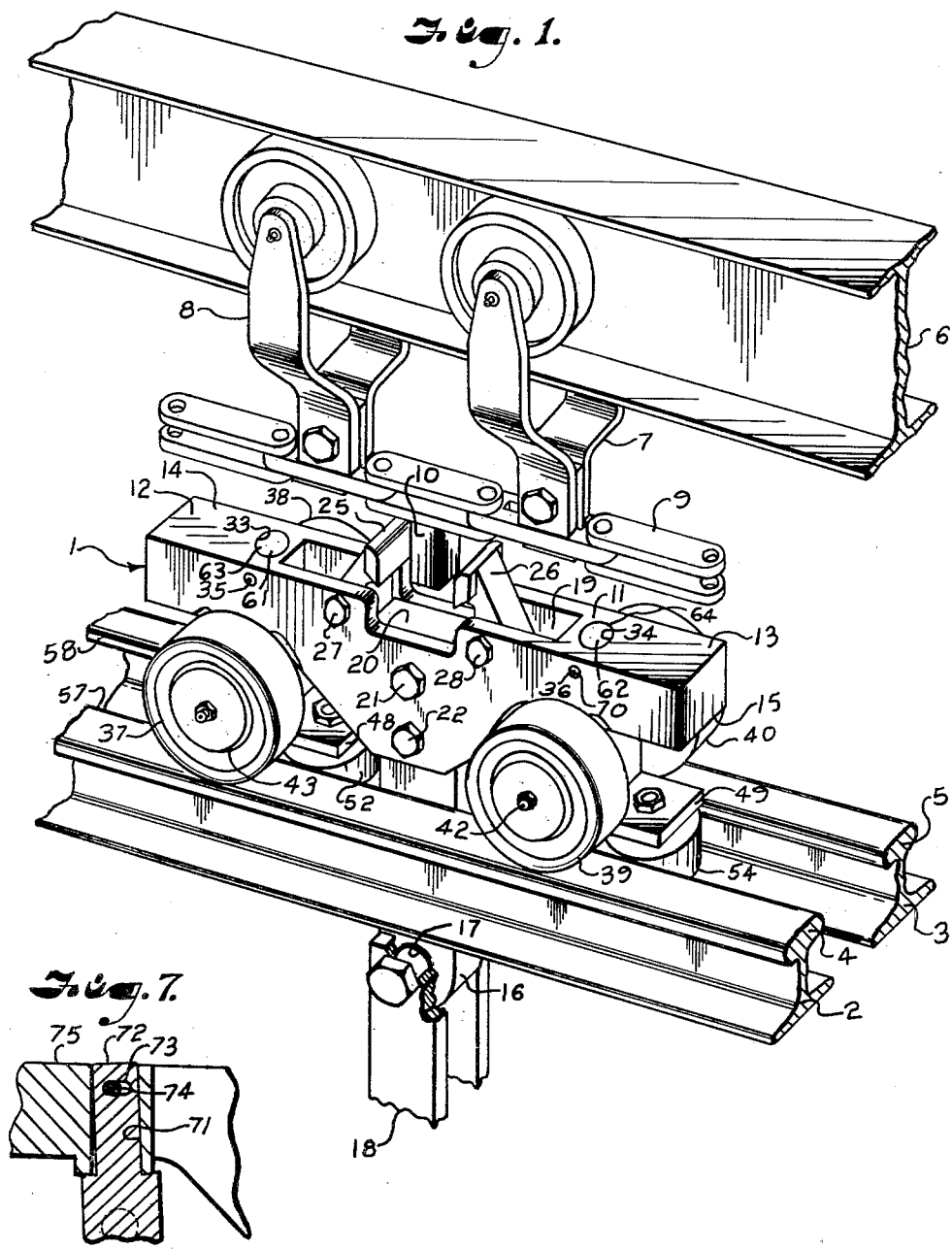

O. R. POTTER ET AL 3,049,083

CONVEYOR TROLLEY

Filed July 3, 1961

INVENTORS
OMER R. POTTER &
BY ALGE T. PETERSON JR.

Fishburn and Gold
ATTORNEYS

United States Patent Office 3,049,083
Patented Aug. 14, 1962

3,049,083
CONVEYOR TROLLEY
Omer R. Potter, Kansas City, Kans., and Alge T. Peterson, Jr., Kansas City, Mo., assignors to Midwest Conveyor Company, Inc., Kansas City, Kans., a corporation of Kansas
Filed July 3, 1961, Ser. No. 121,727
7 Claims. (Cl. 105—156)

The present invention relates to trolleys, and more particularly to load-carrying conveyor trolleys for use with conveyor systems of the type known as power and free. Such systems are generally characterized as having load tracks and a chain track beam usually spaced above the load tracks and chain trolleys engaged with the chain track beam. A power driven chain is adapted to be supported by and advanced along the chain track beam with the chain trolleys and the chain usually exhibits spaced chain dogs positioned to engage the load-carrying trolleys for advancement along the load tracks.

Heretofore, the load track wheels of the load-carrying trolleys have been mounted on front and rear axles normally extending transversely of the trolley frame, and said axles have been mounted on the trolley frame either rigidly or by means of a vertical kingpin or trunnion which is permitted to rotate about a generally vertical axis for steering the load track wheels but is otherwise rigid, i.e., not permitted to deviate from a vertical position or a position which can be described as normal to the plane containing the points of contact between the load track wheels and the load tracks. These mounting configurations generally produce a tendency for the trolley to wander between the limits of lateral travel provided between trolley guide rollers and the load-carrying tracks. This wandering coupled with a non-flexible kingpin mounting tends to cause load swaying, excessive relative motion and consequent wear of movable trolley parts, unnecessary concentration of strain on particular trolley parts and track-supporting members during swaying and shock loading conditions, and other undesirable effects.

It is, therefore, the principal objects of the present invention to provide an improved construction of a load-carrying trolley for use in a power and free conveyor system whereby the trolley is urged into a stable path while advancing along the load-carrying tracks; to provide such a trolley construction wherein the track wheels exhibit a stabilizing caster effect; to provide a trolley track wheel suspension assembly which permits a load to sway, for example, when rounding a curve, without placing unnecessary stress concentration on trolley parts; to provide such a construction which permits the absorption and reduction of shock loads impressed on the track wheels by means of a resilient track wheel suspension assembly; and to provide a stable load-carrying trolley which is of simple construction, economical to produce and rugged and reliable in use.

Other objects and advantages of this invention will become apparent from the following description taken in connection with the accompanying drawings wherein are set forth by way of illustration and example certain embodiments of this invention.

FIG. 1 is a fragmentary perspective view showing a portion of a power and free conveyor system including the improved load-carrying trolley of this invention.

FIG. 2 is a side elevation of the load-carrying trolley with a portion broken away to show details of the track wheel suspension assembly.

FIG. 3 is a sectional view taken on the line 3—3, FIG. 2, showing further details of the track wheel suspension assembly.

FIG. 4 is a sectional view taken on the line 4—4, FIG. 2, showing details of the connection between the trolley frame and the pendant or hanger.

FIG. 7 is a fragmentary sectional view on an enlarged scale showing an alternate kingpin assembly.

Figure 5:
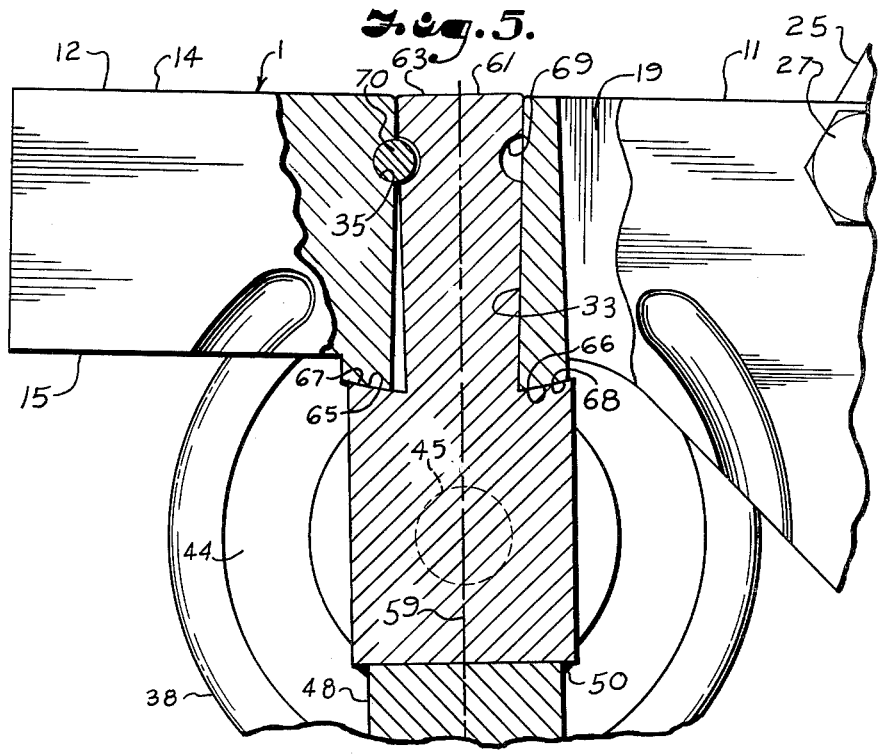
FIG. 5 is a fragmentary view on an enlarged scale with parts broken away showing the tapered kingpin and spherical support bosses in the track wheel suspension assembly.

Referring to the drawings in more detail:

The reference numeral 1 generally indicates the load-carrying trolley of this invention. The trolley 1 is adapted for use in a conveyor system known as the power and free type here illustrated as having horizontally and laterally spaced load tracks 2 and 3 which are preferably of an I-beam like construction but presenting upper rails 4 and 5 respectively having tread surfaces which contact the trolley track wheels as described hereinafter. A chain track beam 6 is spaced above the tracks 2 and 3 and has chain trolleys such as noted at 7 and 8 engaged therewith. The chain trolleys 7 and 8 are adapted to support a conveyor chain 9 in a conventional manner whereby the chain 9 is advanced along the chain track beam 6 with the chain trolleys 7 and 8 by conventional chain driving means (not shown). The chain 9, in the illustrated example, has spaced therealong chain dogs or lugs such as noted at 10 extending downwardly therefrom.

The load-carrying trolley 1 comprises an elongated substantially horizontally extending frame 11 having a forward support member or bar 12 and a rearward support member or bar 13 preferably integral therewith. The support bars 12 and 13 each exhibit an upper surface 14 and a lower surface 15. A pendant or hanger 16 depends from the frame 11 and extends downwardly between the load tracks 2 and 3 and contains a suitable transverse bore 17 for receiving a clevis 18 which supports a typical load (not shown) to be conveyed along beneath the tracks 2 and 3. A rectangular cavity 19 extends vertically through the trolley frame 11 and is adapted to receive the upper end 20 of the hanger 16. Suitable bolts 21 and 22 extend transversely through the frame 11 and also through the hanger 16 and are engaged with suitable nuts 23 and 24 respectively to rigidly secure the hanger 16 to the frame 11. In order to equally distribute the load carried by the hanger 16 between the track wheels described hereinafter, the hanger 16 is preferably located equidistant between the support bars 12 and 13, as best indicated in FIG. 2.

A front drive dog 25 and a rear drive dog 26 are pivotally mounted in spaced relation to the frame 11 by means of suitable bolts 27 and 28 extending therethrough and through the frame 11 and respectively engaged with nuts 29 and 30. As best indicated in FIG. 2, the drive dogs 25 and 26 are counterweighted to maintain a normally upright position extending above the upper surface 14. The pivotal mounting of the drive dogs 25 and 26 permits the selective pivoting thereof to receive the chain dog 10 therebetween as best illustrated in FIG. 2. When the chain dog 10 is between the dogs 25 and 26, the movement thereof by the chain 9 causes contact with the inwardly facing surface of one of the drive dogs 25 or 26 to effect the advance of the trolley along the tracks 2 and 3. The pressure of the chain dog 10 against the inwardly facing surface of one of the drive dogs 25 or 26 urges the respective dog again a heel or bumper 31 which, in the llustrated example, forms a part of the hanger 16 and presents a suitable load-bearing surface 32 for maintaining the respective drive dog in an upright position during the advance of the trolley 1.

Bores or openings 33 and 34 preferably of constant diameter throughout their length extend vertically respectively through the support bars 12 and 13. Horizontal bores 35 and 36 respectively extend laterally through the support bars 12 and 13 and at least partially intersect the respective vertically extending bores 33 and 34 but are offset from the center thereof (FIGS. 2 and 5).

A front pair of vertical track wheels 37 and 38 and a rear pair of track wheels 39 and 40 are adapted to contact and ride upon the tread surfaces of the upper rails 4 and 5. The wheels 37, 38, 39 and 40 are preferably of the type containing ball bearings 41 to minimize the friction loss produced during rolling. The wheels 37, 38, 39 and 40 also preferably include suitable grease fittings 42 secured thereon and adapted to receive a lubricant for the ball bearings 41. Grease seals 43 and 44 cover opposite sides of the wheels 37, 38, 39 and 40 to retain the lubricant therein and prevent dirt and foreign matter from entering into contact with the ball bearings 41.

A front horizontal axle 45 and a rear horizontal axle 46 normally extend laterally of the frame 11 and respectively support for rotation the front pair of track wheels 37 and 38 and the rear pair of track wheels 39 and 40. The respective wheels are supported at opposite ends of the axles 45 and 46 by any suitable means but preferably by swaging 47 to eliminate the possibility of loosening bolts or the like which could produce an accidental separation between the wheel and axle.

Horizontal elongated cross members 48 and 49 are respectively secured at the center portion thereof, for example, by welding, at 50 to the horizontal axles 45 and 46 intermediate the axle ends and normally extending longitudinally of the frame 11. A front pair of horizontal guide rollers 51 and 52 and a rear pair of horizontal guide rollers 53 and 54 depend from each end of the respective horizontal cross members 48 and 49 and are arranged to travel in the space between the upper rails 4 and 5. The horizontal guide rollers 51, 52, 53 and 54 are illustrated herein as containing sleeve bearings 55; however, it is noted that other types of friction reducing bearings will also produce satisfactory results. The horizontal guide rollers 51, 52, 53 and 54 also include suitable grease fittings 56 secured thereto for introducing a lubricant into contact with the bearing surfaces. The guide rollers 51, 52, 53 and 54 are adapted to engage the inner side surfaces 57 and 58 respectively of the upper rails 4 and 5 to rotate the respective horizontal axles 45 and 46 about an upwardly extending axis such as 59 (FIG. 5) for guiding the frame 11 along said upper rails 4 and 5 both on the straightaway and around a curve, as indicated in FIG. 6.

Figure 6:
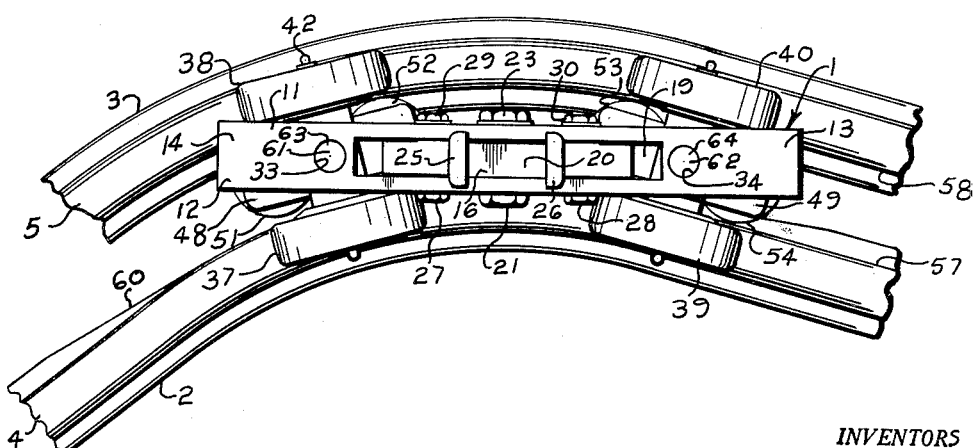
FIG. 6 is a plan view showing the improved trolley on a curved track section.

It is noted that a portion 60 of the track 2 is cut away where necessary to provide clearance for the hanger 16 where the tracks become curved, FIG. 6.

Kingpins 61 and 62 are, in the example shown, integral with the respective horizontal axles 45 and 46 and extend upwardly therefrom coincident with the upwardly extending axis such as noted at 59. The kingpins 61 and 62 respectively extend into each of the vertical bores 33 and 34 and terminate in upper ends 63 and 64 adjacent the upper surface 14 of the support bars 12 and 13. The kingpins 61 and 62 respectively taper inwardly from a diameter substantially equal to the vertical bores 33 and 34 at the upper surface 14 to a diameter substantially smaller than the respective vertical bores 33 and 34 at the lower surface 15 of the support bars 12 and 13.

A spherically concave upwardly facing load-bearing boss 65 is preferably formed integrally with and surrounds each of the kingpins 61 and 62, as best illustrated in FIG. 5. A spherically convex downwardly facing load-bearing boss 66 is preferably formed integrally with each of the support bars 12 and 13 and on the lower surface 15 and surrounds the respective vertical bores 33 and 34. The concave and convex bosses 65 and 66 present mated contacting spherical bearing surfaces 67 and 68 respectively which provide substantial load-bearing structure but permit a resilient or flexible rocking motion of the kingpins 61 and 62 about the center of the spherical bearing surfaces 66 and 67 which falls approximately in the vicinity of the respective kingpin upper ends 63 and 64.

An annular substantially half-round groove 69 extends substantially horizontally around the kingpins 61 and 62 and is aligned with the horizontal bores 35 and 36 respectively. Suitable retaining pins 70 are inserted in each of the horizontal bores 35 and 36 and engage the grooves 69 to retain the kingpins 61 and 62 in the respective vertical bores 33 and 34 while permitting the above-described rocking motion and also permitting the above-described rotating motion of the horizontal axles 45 and 46 about the upwardly extending axes such as noted at 59.

The wheel suspension construction described above causes the pairs of track wheels 37, 38, 39 and 40 to exhibit a caster effect by always urging the kingpins 61 and 62 to support the axles 45 and 46 canted from a true vertical axis or deviating from the vertical, as illustrated in FIG. 5. The caster effect urges the trolley 1 into a stable path during advancement along the tracks 2 and 3, substantially eliminating the lateral wander heretofore experienced with conventional trolley construction wherein the kingpin is maintained on a strictly vertical axis. The flexible construction described above also permits the track wheel and axle assemblies to deflect with respect to the frame 11 to absorb a large portion of the shock loads such as that caused by a rail bump which would otherwise be borne by various trolley members.

The illustration of FIG. 2 depicts the kingpin extending in a vertical plane which is transverse to the tracks 2 and 3, or, in other words, "dead center." This is an unstable condition which, if ever realized, is realized only momentarily. The normal position of the kingpin will be such that it is resting against either the forward or rearward (FIG. 5) walls of the vertical bores 33 and 34 and with the axis thereof in a plane parallel to the tracks 2 and 3. The normal position of the kingpin axis in a plane transverse to the tracks 2 and 3 is illustrated in FIG. 3, wherein the kingpin is substantially equidistant from the side walls of the vertical bores 33 and 34. This position will be altered, however, when a relative rise or fall is experienced by either of the track wheels in a pair, such as 39 and 40, and will also be disturbed when the load carried by the trolley sways outwardly due to the centrifugal force produced when the trolley rounds a curve, such as illustrated in FIG. 6. This relative motion or flexibility between the kingpin and the trolley frame (supported at bearing surfaces 67 and 68) tends to keep the load carried by the trolley equally distributed among the four track wheels, a desirable condition.

One alternative kingpin assembly is illustrated in FIG. 7 wherein the vertical bore noted as 71 is tapered and the kingpin 72 is a constant diameter along its length. An alternative means of retaining the kingpin with respect to the support bar is also illustrated in FIG. 7 and comprises a horizontally and laterally extending slot 73 extending through the kingpin and adapted to receive a suitable pin 74 which is retained in a suitable bore in the support bar 75. The slot 73 is wide enough to permit the required rotation of the kingpin 72 during steering around a curve and yet prevents an accidental disassembly.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. In a load-carrying trolley, a trolley frame, a support bar fixed to said frame and extending therefrom, an upwardly extending bore in said support bar, a pair of track wheels, a horizontal axle normally extending laterally of said frame and rotatably supporting said wheels at opposite ends thereof, a kingpin fixed to said axle and extending upwardly therefrom and into said bore, said kingpin being tapered inwardly from a dimension substantially equal to said bore to a dimension substantially smaller than said bore as it extends downwardly, a spherically concave upwardly facing load-bearing boss on said kingpin and surrounding said kingpin, a spherically convex downwardly facing load-bearing boss on said support bar and surrounding said bore, said bosses presenting mated contacting spherical bearing surfaces located above said axle and adjacent a lower portion of said kingpin, whereby said track wheels are adapted to move horizontally in a rocking motion with respect to said support bar.

2. A load-carrying trolley for use in a power and free conveyor system of the type having laterally spaced load tracks and an advancing chain above said tracks exhibiting a chain lug extending downwardly therefrom; said trolley comprising an elongated substantially horizontally extending frame having a support bar, said support bar exhibiting an upper and a lower surface, a hanger depending from said frame and being adapted to extend between said load tracks and support a load, a front and a rear drive dog pivotally mounted in spaced relation on said frame and counterweighted to maintain a normally upright position extending above said upper surface, said drive dogs being adapted to receive the chain lug therebetween for effecting the advance of said trolley, a constant diameter vertically extending bore in said support bar, a pair of vertical track wheels adapted to ride on said tracks, a horizontal axle normally extending laterally of said frame and rotatably supporting said pair of track wheels at opposite ends thereof, means fixed to said axle intermediate the ends thereof and normally extending longitudinally of said frame for rotating said axle about an upwardly extending axis for guiding said frame along said tracks, a kingpin fixed to said axle and extending upwardly therefrom and into said vertically extending bore, said kingpin terminating in an upper end near said support bar upper surface, said kingpin tapering inwardly from a diameter substantially equal to said vertically extending bore near said support bar upper surface to a diameter substantially smaller than said vertically extending bore at said support bar lower surface, an annular horizontal substantially half-round groove in said kingpin, and a horizontally extending retaining pin in said support bar and engaging in said groove to loosely retain said kingpin in said vertically extending bore.

3. A load-carrying trolley for use in a conveyor system having spaced tracks comprising, a frame, a support member fixed to said frame and extending therefrom, a pair of track wheels located adjacent said support member, said wheels being adapted to ride on said tracks, a horizontal axle normally extending laterally of said frame and rotatably supporting said wheels at opposite ends thereof, a generally vertically extending kingpin member operatively associated with said axle intermediate said axle ends and adapted to support said axle for pivotal movement about a generally vertically extending axis, and a kingpin member receiver operatively associated with said support member for mounting said kingpin member in supported relation with respect to said support member, said kingpin member receiver being of a size greater than said kingpin member to permit horizontal movement between said kingpin member and said support member whereby horizontal movement is permitted between the axle and support member.

4. The trolley of claim 3 wherein said kingpin member receiver is adapted to normally support the kingpin member in a vertical plane which extends longitudinally of the tracks and at an angle deviating from the vertical whereby said track wheels exhibit a caster effect.

5. The trolley of claim 4 wherein a spherical load-bearing member is associated with said kingpin member and a sperical load-bearing member is associated with said support member, said load-bearing members presenting metal contacting spherical bearing surfaces located above said horizontal axle.

6. The apparatus of claim 1 including guiding means associated with said axle for guiding said track wheels.

7. The apparatus of claim 3 wherein a support member extends forwardly and a support member extends rearwardly of said frame, and a load-carrying member is secured to said frame between said support members.

References Cited in the file of this patent

UNITED STATES PATENTS

| | | |
|---|---|---|
| 1,312,417 | Mosher | Aug. 5, 1919 |
| 2,512,034 | Moore | June 20, 1950 |
| 2,751,852 | Joy | June 26, 1956 |
| 2,971,474 | Klamp | Feb. 14, 1961 |